US006159577A

United States Patent [19]

Pynenburg et al.

[11] Patent Number: 6,159,577

[45] Date of Patent: Dec. 12, 2000

[54] MAGNETIC MODIFIABLE SIGN SYSTEM

[75] Inventors: Adrian W. Pynenburg; Gary S. Pasternak, both of Brantford, Canada

[73] Assignee: Storeimage Programs Inc., Brantford, Canada

[21] Appl. No.: 09/395,794

[22] Filed: Sep. 14, 1999

[51] Int. Cl.$^{7}$ .................................. B32B 3/10; B32B 7/06

[52] U.S. Cl. .............................. 428/99; 428/79; 428/900; 40/600; 40/621

[58] Field of Search .................................. 428/79, 77, 99, 428/900; 40/600, 621

[56] References Cited

U.S. PATENT DOCUMENTS 5,852,890 12/1998 Pynenburg .................................. 40/621

*Primary Examiner*—Alexander S. Thomas
*Attorney, Agent, or Firm*—Howard J. Greenwald

[57] ABSTRACT

A magnetic modifiable sign system comprised of a plastic substrate, a layer of magnetic ink, a layer of ultraviolet curable white ink, a layer of ultraviolet curable colored ink, and a multiplicity of flexible magnetic sheets which are removably and magnetically attached to the layer of magnetic ink through the layer of ultraviolet curable white ink. The distance between the top surface of the layer of magnetic ink and the top surface of the layer of ultraviolet curable colored ink is less than about 0.006 inches.

14 Claims, 7 Drawing Sheets

MAGNETIC MODIFIABLE SIGN SYSTEM

FIELD OF THE INVENTION

A sign system containing a multiplicity of sign parts removably and magnetically attached to a write on/wipe off plastic substrate.

BACKGROUND OF THE INVENTION

U.S. Pat. No. 5,852,890 of Adrain W. Pynenburg discloses a magnetic modifiable sign system comprised of a base made of hardboard material, a steel sheet attached to the base, and a plastic substrate disposed over the steel sheet. This system is relatively heavy and cumbersome, and it cannot readily be used with a wide variety of sign-mounting systems.

It is an object of this invention to provide a magnetic modifiable sign system which is lightweight, flexible, and can be mounted in a variety of sign mounting devices.

It is another object of this invention to provide a magnetic modifiable sign system which has write on/wipe off properties.

It is yet another object of this invention to provide a cost effective process for making virtually all types of flat sign surfaces magnetically compatible.

SUMMARY OF THE INVENTION

In accordance with this invention, there is provided a magnetic modifiable sign system with a top surface with write on/wipe off properties, comprised of a plastic substrate with a top surface and a bottom surface, a first layer of magnetic ink contiguous with the top layer of the substrate, a second layer of white ultraviolet curable ink contiguous with the first layer of magnetic ink, and a third layer of non-white ink contiguous with the layer of white ultraviolet ink. wherein the distance between the first layer of magnetic ink and the top surface of the sign system is less than 0.006 inches. A multiplicity of sheets of flexible magnetic material are magnetically attached to the first layer of magnetic ink through the third layer of non-white ink and the second layer of white ultraviolet ink.

BRIEF DESCRIPTION OF THE DRAWINGS

The claimed invention will be described by reference to the specification and to the following drawings, in which like numerals refer to like elements, and in which:

DESCRIPTION OF THE PREFERRED EMBODIMENTS

Figure 1:
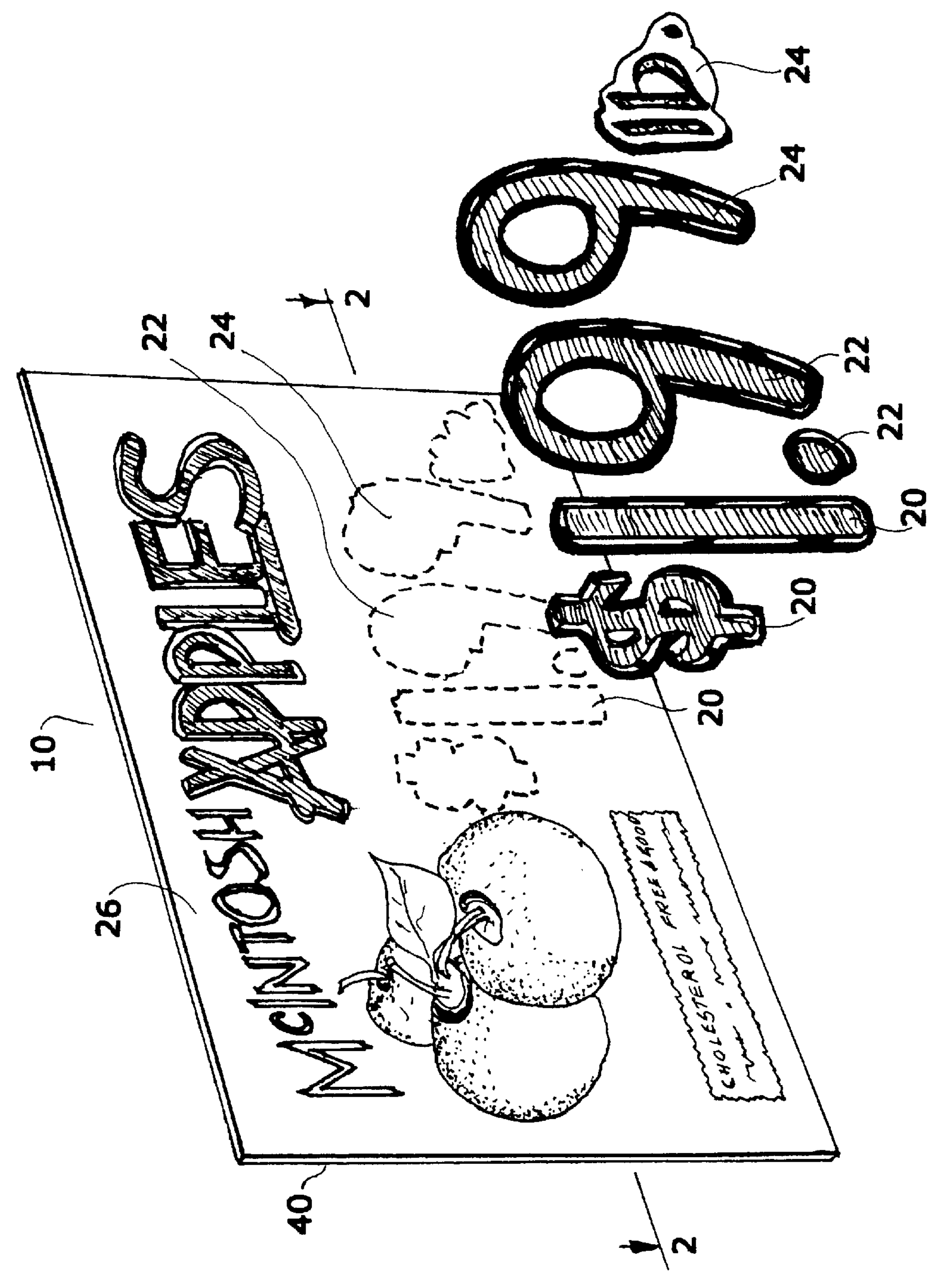
FIG. 1 is a perspective view of a preferred sign system of the invention.

FIG. 1 is a perspective view of a preferred sign system 10 which is comprised of a multiplicity of sheets of flexible magnetic material identified as 20, 22, and/or 24, a top surface 26 of sign system 10, and a bottom surface 40.

Figure 2:
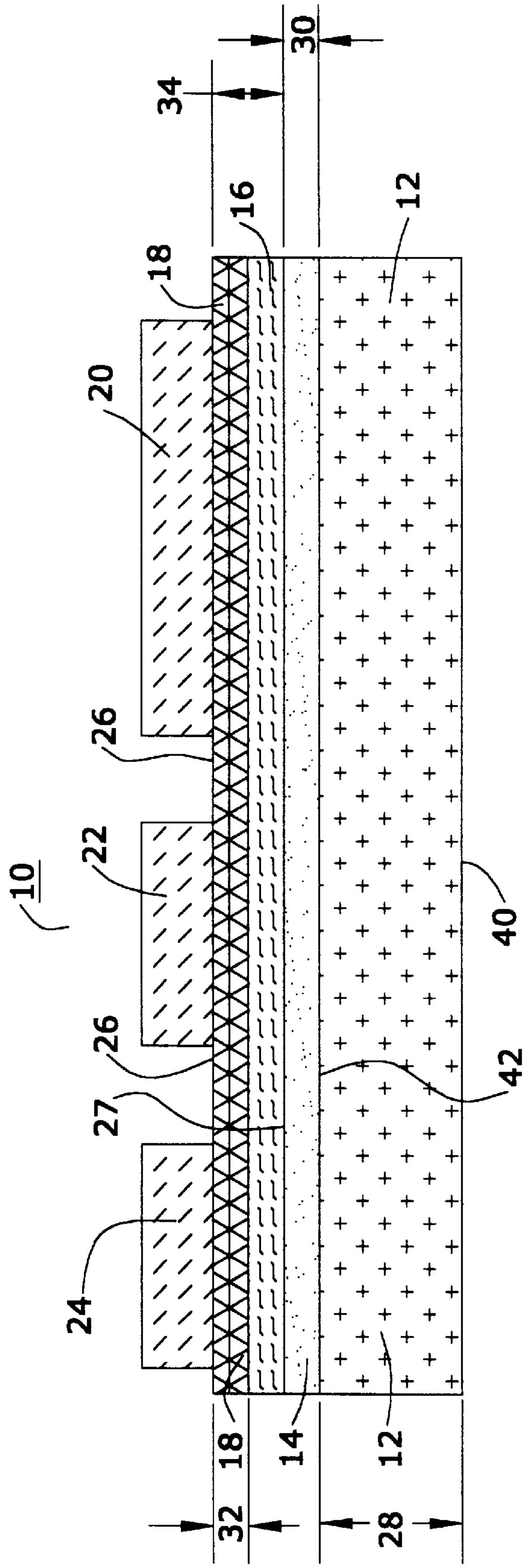
FIG. 2 is a sectional view of the preferred sign system of FIG. 1.

FIG. 2 is a sectional view, not drawn to scale, of the magnetic sign system of FIG. 1, taken along line 1—1. Referring to this FIG. 2, and in the preferred embodiment depicted therein, it will be seen that sign system 10 is comprised of a plastic substrate 12, a first layer of magnetic ink 14, a second layer of white ultraviolet ink 16, a third layer of non-white ink 18, a first sheet of flexible magnetic material 20, a second sheet of flexible magnetic material 22, and a third sheet of flexible magnetic material 24.

Referring again to FIG. 2, it will be seen that the top surface 26 of the magnetic sign system 10 is a "write on/wipe off" surface. The term "write on/wife off," as used in this specification, refers to a surface which, when marked with a wipe off paint marker and thereafter stored under ambient conditions for at least 48 hours, is capable of having its marking removed with "Simple Green" cleaner without "ghosting."

"Write on/wipe off" surfaces are well known to those skilled in the art and are described, e.g., in U.S. Pat. Nos. 5,904,377 (write on, wipe off pen and flexible write on, wipe off material), 5,775,919, 5,104,087, 5,303,891 (melamine write on, wipe off surface), 5,140,087, 4,757,901 (polyester write on, wife off surface), 4,6814,009, 4,386,475, and the like. The disclosure of each of these United States patents is hereby incorporated by reference into this specification.

The markers used with these write on, wipe off surfaces are also well known to those in the art. See, e.g., U.S. Pat. Nos. 5,775,919, 5,741,561 (dry erase marker), 5,736,249 (magic marker ink), 5,503,891, 5,213,507, 5,028,047, 4,060, 246 ("Rite On, Wipe Off" marker manufactured by the Alliance Wall Corp.), etc. The disclosure of each of these United States patents is hereby incorporated by reference into this specification.

In one preferred embodiment, a water-based fluorescent paint is used to write on the sign of this invention. In another embodiment, a water-based paint marker marketed under the trade name of "UNI POSCA" by Eberhard Faber, Inc. of Lewisburg, Tenn. is used to write on the sign of this invention. These markers, which are available in a variety of colors (including magenta, purple, blue, yellow, green, and orange), are described by the manufacturer as "water-base opaque paint in a marker."

The sign of this invention, after being written on with one of such water-based paint markers and allowed to stand for at least 48 hours under ambient conditions, is capable of having the paint readily removed without "ghosting" by "Simple Green" cleaner.

As is known to those skilled in the art, "ghosting" is a residual image left on a cleaned surface, generally caused by traces of paint that remain in or on the treated surface; see, e.g., U.S. Pat. Nos. 4,937,910, 5,712,234, and 5,900,094, the entire disclosures of which are hereby incorporated by reference into this specification.

Many water-based cleaners are commonly used to remove paint from the "write on, wipe off" surfaces. One popular cleaner is sold as "Simple Green" by the Sunshine Makers, Inc. company of Post Office Box 2708, Huntington Beach, Calif. This cleaner is comprised of about 5.8 weight percent of glycol ether ethylene glycol monobutyl ehter (sold commercially as "butyl cellosolve"), about 3.75 weight percent of nonylphenol ethoxylate, about 1.5 weight percent of tetrapotassium pyrophosphate, and about 88.95 weight percent of water; see, e.g., U.S. Pat. Nos. 5,856,289, 5,802,425, 5,792,294, 5,593,888, and 5,532,024, the entire disclosures of which are hereby incorporated by reference into this specification.

Applicant has discovered that, in order to obtain the "write on/wipe off" characteristic, a certain specified combination of materials must be used. In particular, he has discovered that the white ink layer 16 must comprise ultraviolet ink.

Referring again to FIG. 2, the sign of this invention is comprised of a sheet 12 of material, preferably plastic material, which can be screen printed. Screen printing is a method of printing in which ink is forced by a rubber squeegee through a silk, paint, or stencil screen (as through a sieve or strainer) onto the plastic surface. See, e.g., U.S. Pat. Nos. 5,914,197, 5,857,791, 5,822,898 (screen printing onto acrylic plastic), 5,709,923, 5,548,003 (screen printing onto a foamable plastic surface), 5,483,003, 5,460,679 (screen printing onto clear plastic) 5,429,045, 5,142,975, 5,053,300 (screen printing onto polycarbonate, acrylic, and polyvinyl chloride substrates), 5,008,130, 4,787,687, 4,571,864, 4,456,422 (screen printing onto flexible plastic), 4,270,449 (screen printing onto polyester elastomer), 4,248,958 (screen printing onto polyester), 4,104,219 (screen printing onto plastic webs), 3,872,044 (screen printing onto polyethylene), and the like. The disclosure of each of these United States patents is hereby incorporated by reference into this specification.

In one embodiment, it is preferred that sheet 12 consist essentially of a plastic material selected from the group consisting of acrylonitrile-butadiene styrene (ABS), polyvinyl chloride, expanded polyvinyl chloride, and polystyrene. In one aspect of this embodiment, sheet 12 has a thickness of from about 0.010 to about 0.375 inches.

In another embodiment, it is preferred that sheet 12 consist essentially of rigid materials, such as gatorboard, hardboard, medium density fiber board, honeycomb, and the like. In one aspect of this embodiment, sheet 12 has a thickness of from about 0.125 to about 1.5 inches.

In one embodiment, sheet 12 is a sheet consisting of of high impact polystyrene with a specific gravity of 1.054 to 1.070, a tensile strength of from about 4,000 to about 10,000 pounds per square inch, and a compressive strength of from about 12,000 to about 17,000 pounds per square inch.

In one embodiment, sheet 12 is a sheet of "silkscreen grade sheet" of polystyrene sold as "Prime Impax 650" by the Primex Plastics Corproration of 1235 North F Street, Richmond, Ind. This material preferably comes in rectangular sheets which are about 40"×72" and have thicknesses preferably ranging from 0.010 to about 0.125 inches. It is preferred that the thickness 28 of plastic layer 12 be from about 0.015 to about 0.060 inches.

Referring again to FIG. 2, a layer of magnetic ink 14 which has a thickness 30 of less than about 5 mils is then silk-screened onto plastic layer 12. In one embodiment, the thickness 30 of the magnetic ink layer 30 is less than about 0.005 inches and, preferably, about 0.001 inches.

Magnetic inks are well known to those skilled in the art. Thus, by way of illustration and not limitation, such magnetic inks are disclosed in. e.g., U.S. Pat. Nos. 5,857,709, 5,853,797, 5,803,753, 5,712,564, 5,622,388, 5,597,405, 5,545,885, 5,514,467, 5,506,709, 5,499,015, 5,488,293, 5,440,106, 5,354,099, 5,341,193, 5,330,275, 5,289,122, 5,240,626, 5,118,348, 5,095,470, 4,984,281, 4,484,081, 4,797,938, 4,584,529, 4,517,268, 4,296,176, 4,195,303, and the like. The disclosure of each of these United States patents is hereby incorporated by reference into this specification.

Magnetic inks are readily commercially available. By way of illustration and not limitation, these magnetic inks may be obtained, from, e.g., the Allied Photo Offset Supply Corporation (of 2040 Lee Street, Hollywood, Fla.), the Gans Ink and Supply Company, Inc. (of 1551 North Ellsworth Avenue,, Villa Park, Ill.), the Heath Custom Press, Inc. (of 1701 N.E. 43rd Street, Renton, Wash.), the Kohl & Madden Printing Ink Corporation (of Fort Lee, N.J.), Prime UV Dryers (of 340 Windy Point Drive, Glendale Heights, Ill.), the Printers Ink & Supply Company, Inc. (of 542 North 7th Street, Birmingham, Ala.), the Spinks Ink Company (of 961 Apricot Avenue, Sarasota, Fla.), the Superior Printing Ink Co., Inc. (of 70 Bethune Street, New York, N.Y.), Van Son Holland Ink (of 92 Union Street, Mineola, N.Y.), and the like.

In one embodiment, the magnetic ink used is a "Specialty Grey Magnetic Ink for Vinyl" sold as item VVS74 by Sericol, Inc. of 20 West 14th Avenue, North Kansas City, Mo. It is preferred to apply this ink to substrate 12 by screen printing and to apply a layer 14 of magnetic ink with a thickness 30 of less than about 0.005 inches using a 175 mesh screen; the ink so applied is preferably first dried with conventional dryers and is then allowed to air dry for a period of from about 10 to about 120 minutes.

After the magnetic ink layer 14 has dried, a layer of white 16 ultraviolet curable screen printing ink is applied on top of the layer 14 of magnetic ink; this is done in order to provide a white, printable surface onto which graphics can be printed. It is preferred to use sufficient ink so that the layer 16 has a thickness of less than about 4 mils and, more preferably, less than about 3 mils; to this end, screen printing with a 380 mesh screen may be utilized. In one embodiment, the layer 16 has a thickness less than about 2 mils.

As is known to those in the art, "UV inks," which are also referred to as "ultraviolet inks" or "UV curable screen ink," are screen printing inks which are cured when exposed to ultraviolet radiation. They are well known to those skilled in the art and are described, e.g., in U.S. Pat. Nos. 5,830,529, 5,700,036, 5,232,505, 5,148,355, 5,085,697, 4,929,469, 4,820,549, 4,680,368, and the like. The disclosure of each of these United States patents is hereby incorporated by reference into this specification.

In one preferred embodiment, the white ultraviolet ink used is a high gloss, fasting curing ultraviolet ink sold under the name of "Fascure P.O.P." by Sericol, Inc. of 1101 West Cambridge Circle Drive, Kansas City, Kans. This ink, and other "Fascure P.O.P." inks, can be printed and cured well through screen meshes between 355 to 390 (140 to 154/cm) monofilament polyester. This type of ultraviolet curable ink is dependent upon a relatively high dosage of ultraviolet to initiate the curing process that coverts the wet film to dry film. In a curing unit containing one 200-watt/inch (80 watts/centimeters) lamp, these inks will normally cure at 50–60 feet (15–18 meters) per minute.

The layer 16 must be produced by screening printing an ultraviolet ink. If a non-ultraviolet ink is used, the top surface 26 (see FIG. 2) will not possess "write on, wipe off" characteristics.

In one experiment, the white "Fascure P.O.P." was replaced by a screen printing ink which was not ultraviolet curable. "Brilliant White" ink, sold as product GP-001 by A.

R. Monteith, Ltd. of 2615 Wharton Glen, Mississauga, Ontario, was used in this experiment instead of the "Fascure P.O.P." white ink, and it was also screen printed using a 380 mesh screen. Thereafter, with the use of the "four-color-printing process," and with the use of cyan, yellow, magenta, and black, the identical layer 18 (see FIG. 2) were screen printed onto both white paint surfaces using the identical conditions. The top surface 26 of the sign which had a ultraviolet curable white layer had write on/wipe off characteristics. The top surface of the sign which had a non-ultraviolet curable white layer did not have such write on/wipe off properties, as evidenced by the fact that ghosting appeared.

Referring again to FIG. 2, after white layer 16 has been dried, one or more colors may be screen printed onto it to form layer 18. In one embodiment, the "four color printing process" may be used for this purpose.

As is known to those skilled in the art, the four color printing process is a process involving overprinting a series of four plates in yellow, magenta, cyan, and black ink. See, e.g., U.S. Pat. Nos. 5,093,713, 5,867,882, 5,842,413, 5,823,576, 5,752,441, 5,740,732, 5,733,634, 5.732,624, 5,687,300, 5,594,839, 5,583,660, 5,562,030, 5,418,627, 5,410,958, 5,381,247, 5,323,245, 5,264,926, 5,258,832, 5,253,084, 5,166,809, 4,927,663, 4,924,031, 4,758,886, 4,499,489, 4,458,175, 4,080,055, 3,742,129, 3,732,809, and the like. The entire disclosure of each of these United States patents is hereby incorporated by reference into this specification.

Referring again to FIG. 2, and in the preferred embodiment depicted therein, it will be seen that layer 18 is preferably printed over layer 16. Layer 18 may comprise one color, two colors, three colors, or four or more colors; when the four color printing process is used, the four colors so printed combine to make one layer 18. In general layer 18 has a thickness 32 which is less than about 0.004" and, preferably, less than about 0.003".

It is preferred that the ink or inks which comprise layer 18 be ultraviolet curable inks.

Thus, by way of illustration, the ink or inks which comprise layer 18 can be one or more of the "MPPR" screen printing inks sold by Serical, Inc. of 20 West 14$^{th}$ Avenue, North Kansas City, Mo. One may use, e.g., the Black Satin UV ink in this series.

Thus, by way of further illustration, the ink or inks can be one or more of the non-white "Fascure P.O.P." inks described elsewhere in this specification. Additionally, or alternatively, the ink or inks can be blends of one or more of the Fascure P.O.P. colors with one or more of Sericol's MR and/or MR Matte inks.

In order to obtain the properties desired for sign system 10, the distance 34 between the top surface 27 of magnetic ink layer 14 and the top surface 26 of the sign (which is also the top surface of layer 18) must be less than about 0.006 inches and, preferably, less than about 0.0055 inches.

Referring again to FIG. 2, and in the preferred embodiment depicted therein, it will be seen that sign system 10 is preferably comprised of a multiplicity of die-cut flexible magnetic materials 20, 22, and 24. These die-cut flexible magnetic materials are similar to the die-cut flexible magnetic materials disclosed in U.S. Pat. No. 5,852,890, the entire disclosure of which is hereby incorporated by reference into this specification. The die-cut flexible magnetic materials may have printed on them advertising graphics. It is preferred that each of these flexible magnetic materials have a thickness of from about 25 to about 60 mils (0.025 to about 0.060 inches).

The magnetic materials used may be any magnetic material which is both flexible and magnetic. These materials are well known to those skilled in the art and include, for example, those magnetic materials disclosed in U.S. Pat. No. 5,428,332 (magnetic rubber), U.S. Pat. Nos. 5,422,156 (flexible magnetic strip), 5,419,959 (flexible recording media), 5,409,590 (flexible magnetic material), 5,400,088 (velcro material attached to a flexible magnetic tape), 5,388,382 (magnetic strip), 5,383,534 (flexible magnetic sheet), 5,383,510 (flexible magnetic edge strips), 5,383,078 (flexible magnetic sheet), 5,357,061 (flexible magnetic substrate), 5,354,462 (flexible magnetic strap assembly), 5,336,498 (flexible pad with magnetic tape), 5,327,673 (flexible magnetic material), 5,312,145 (flexible magnetic material comprised of a polymer matrix(, and the like. The disclosure of each of these United States patents is hereby incorporated by reference into this specification.

A Chalkboard Sign System

Figure 4:
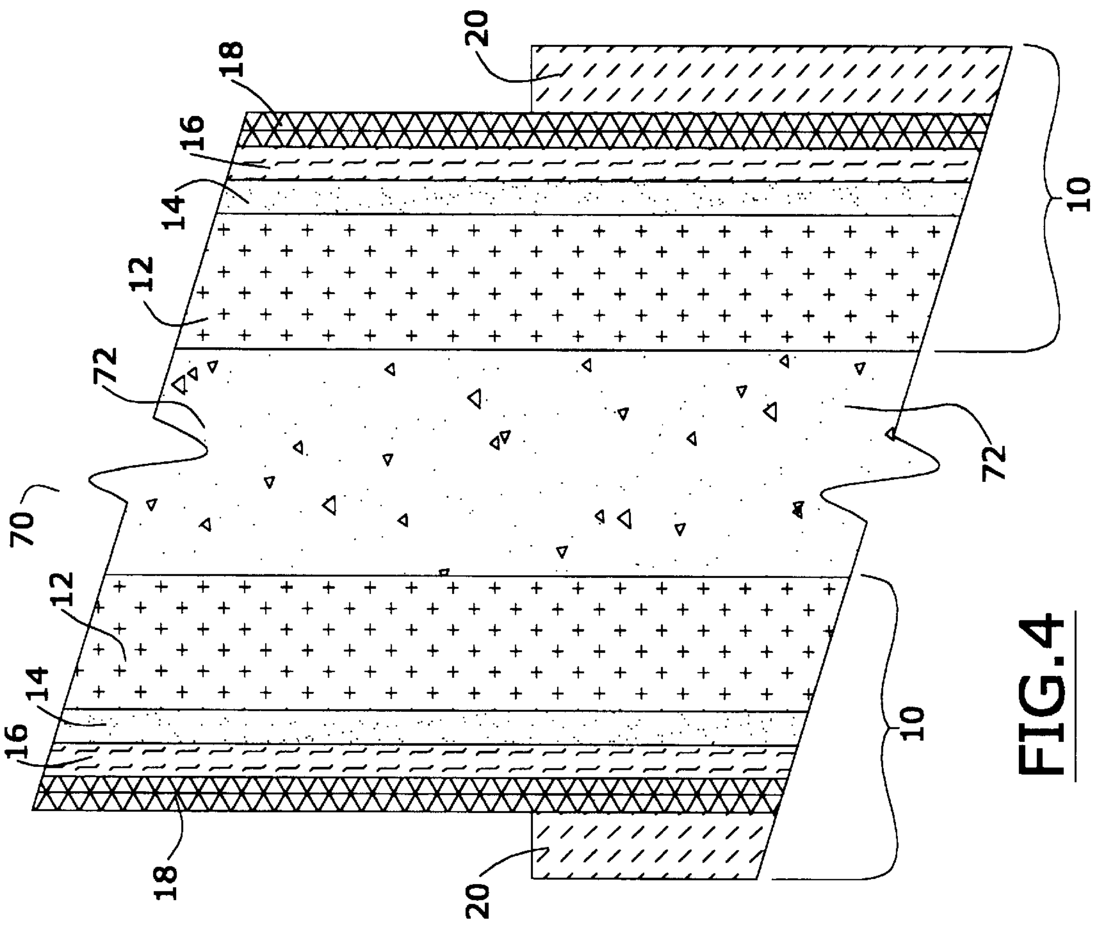
FIG. 4 is an expanded view of a portion of the sign system of FIG. 3.
Figure 3:
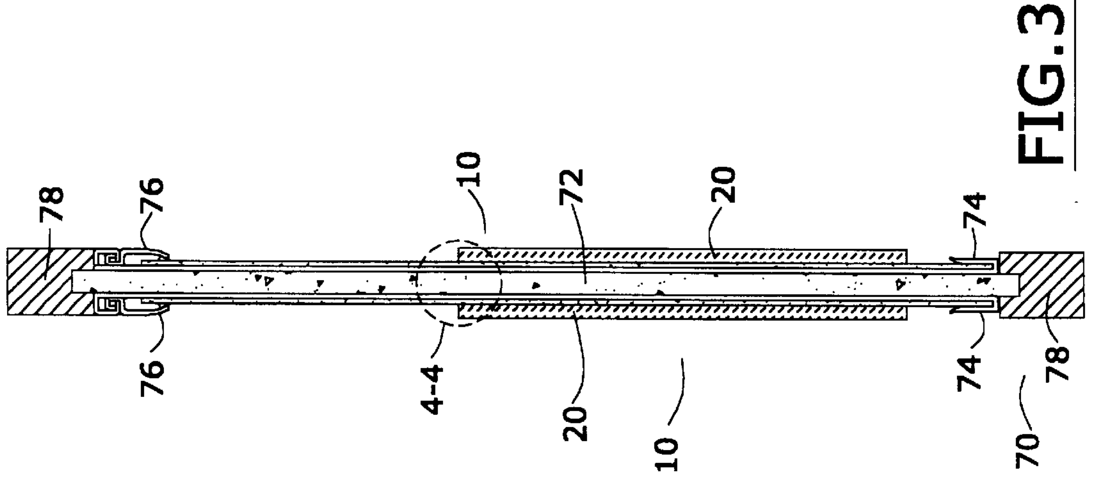
FIG. 3 is a side view of another sign system of this invention.

FIG. 3 is a side view of a chalkboard sign system 70; and FIG. 4 is a expanded view of a section of the chalkboard sign system 70.

Chalkboard sign system 70 is similar in many respects to the chalkboard sign system 10 depicted in FIGS. 2, 3, and 4 of U.S. Pat. No. 5,852,890, the entire disclosure of which is hereby incorporated by reference into this specification. However, system 70 differs from sign system 10 in that the former system contains layers of magnetic ink 14 but omits the steel sheets 44 and 46 present in the latter system.

Referring to FIGS. 3 and 4, it will be seen that sign system 70 is comprised of a sign base 72 which is similar to the sign base 42 depicted in the Figures of U.S. Pat. No. 5,852,890. In one embodiment sign base 42 is a hardboard base with a width of about 0.12 inches.

Attached to sign base 72 is the sign system 10 depicted in FIGS. 1 and 2 of this specification. In the preferred embodiment depicted in FIGS. 3 and 4, separate sign systems 10 are disposed on each side of base 72 and held in place thereon by means of a J-shaped plastic channel 74 at the bottom of the structure and a snap panel holder 76 at the top of the structure. The J-shaped plastic channel 74 is similar to the J-shaped plastic channel 17 depicted in FIGS. 3 and 4 of U.S. Pat. No. 5,852,890; and the snap panel holder 76 is similar to the snap panel holder 19 depicted in FIGS. 3 and 4 of U.S. Pat. No. 5,852,890.

The sign system 10/base 72/sign system 10 assembly is disposed within a frame 78, which is preferably made out of wood or plastic material; the frame 78 is similar to the frame 40 depicted in FIGS. 3 and 4 of U.S. Pat. No. 5,852,890.

A multiplicity of sheets 20 of flexible magnetic material are magnetically attached to said layer of magnetic ink 14 through plastic sheets 12. Flexible magnetic sheets 20 are similar to the flexible magnetic members 48 depicted in FIGS. 3 and 4 of U.S. Pat. No. 5,852,890.

A Sign System Disposed Within an Extruded Base

Figure 6:
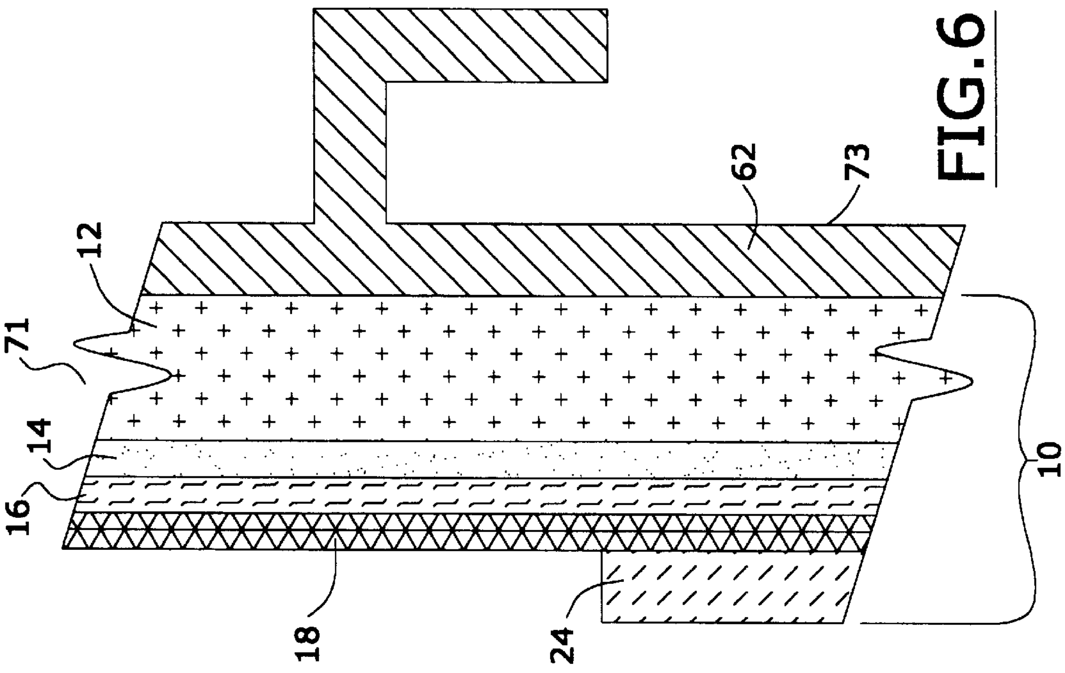
FIG. 6 is an expanded view of a portion of the sign system of FIG. 5.
Figure 5:
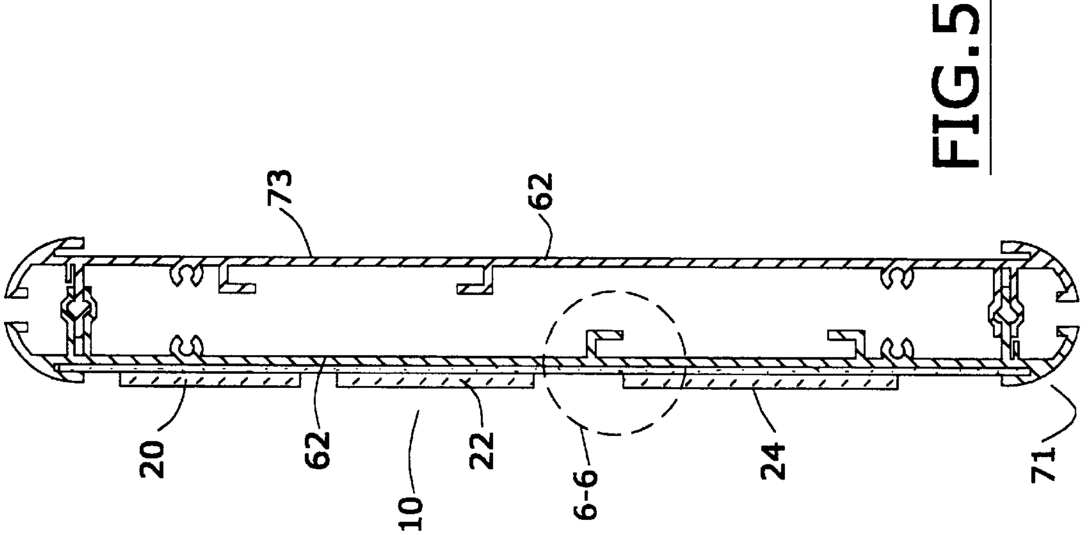
FIG. 5 is a side view of yet another sign system of the invention.

FIG. 5 is a side view of a sign system 71 in which the sign system 10 of FIGS. 1 and 2 is removably mounted within an extruded base 62 which may be, e.g., extruded from polyvinyl chloride; and FIG. 6 is an expanded view of a section of such sign system 71. As will be apparent to those skilled in the art, another sign system 10 may be removably attached to surface 73 of extruded base 62.

Another Preferred Sign System of the Invention

Figure 7:
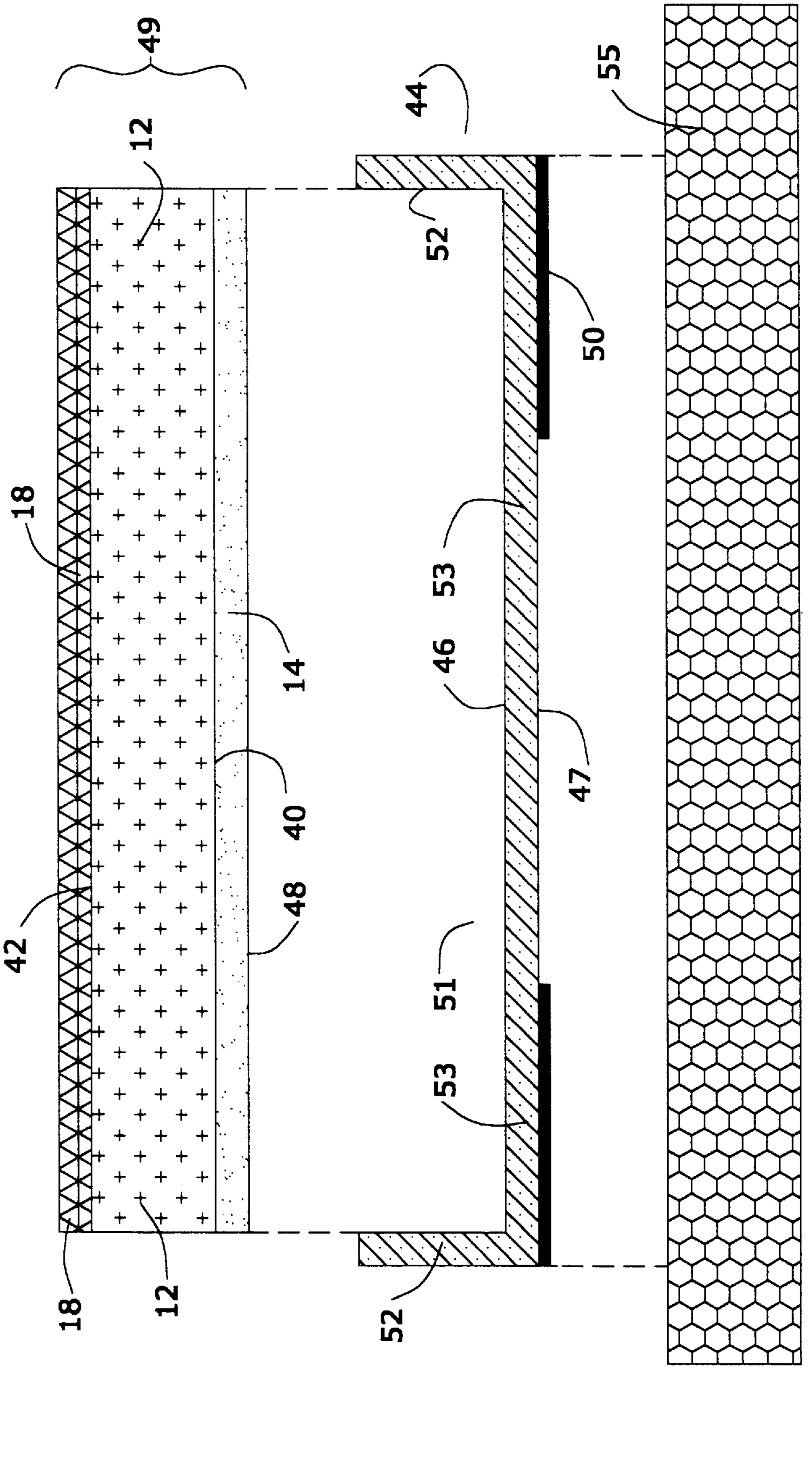
FIG. 7 is an exploded view of another sign system of the invention.

FIG. 7 is an exploded view of another preferred sign system of the invention which is similar in some respects to the sign system of FIGS. 1 and 2. One of the differences between this system is that, in the system of FIG. 7, the layer of magnetic ink 14 is printed on the bottom surface of substrate 12 rather than on its top surface. Another of the differences is that, when layer 12 is a white substrate, there is no need for an intermediate layer 16 between the top surface 42 of layer 12 and layer 18.

Layers 18, 12, and 14 arc preferably an integral assembly which is removably and magnetically attached to a magnetic extrusion 44 whose surface 46 is magnetized and thus attracts surface 48 of layer 14. The preparation and use of extruded articles which contain one or more surfaces which are magnetized are well known in the art and are described, e.g., in U.S. Pat. Nos. 5,715,841 (flexible magnetic extrusions sold by Magnum Magnetics company), reissue Pat. No. 32,106 (Koroseal magnetic extrusions), 5,090,354, 5,012,586 (magnetic extrusions disclosed in "45242 U.S.A./ Ultra Mag Magnetic Extrusions Product Information Sheet, Magnets Inc., 1140 Dearfield Road, Cincinnati, Ohio), and the like. The disclosure of each of these United States patent applications is hereby incorporated by reference into this specification Magnetic extrusions are commercially available in a variety of sizes and shapes, with a variety of different surfaces magnetized. By way of illustration, such extrusions, under the tradename of "Promag," can be obtained from Magnetic Specialty, Inc., 707 Gilman Street, Marietta, Ohio. By way of further illustration, flexible magnetic products (sheeting, strip, and custom extrusions) can be obtained from Flexmag Industries, Inc., 107 Industry Road, Marietta, Ohio.

In the preferred embodiment illustrated in FIG. 7, outwardly extending alignment arms 52 together with base 53 define a channel 51, within which the assembly 49 (comprised of layers 18, 12, and 14) may be disposed.

Referring again to FIG. 7, flexible extrusion 44 may be permanently attached to base 55 by means of adhesive 50. Thereafter, because of the magnetic attraction between surfaces 46 and 48, the layer 18/12/14 assembly may be removably attached to magnetic extrusion 44. Alternatively such layer 18/12/14 may be removably attached to magnetic sheet material.

In the preferred embodiment depicted in FIG. 7, surface 46 of magnetic extrusion 44 is magnetized, and surface 47 of such extrusion 44 is not magnetized.

Base 55 is preferably comprised of a relatively lightweight material. In one preferred embodiment, base 55 consists essentially of "Gatorboard." As is known to those skilled in the art, "Gatorboard" is a styrene foam sheet laminated with white, tan, or black kraft process paper which is manufactured by the International Paper Company of 6400 Poplar Avenue, Memphis, Tenn. See, e.g., U.S. Pat. Nos. 5,438,717 and 5,024,015, the entire disclosures of which are hereby incorporated by reference into this specification.

Figure 8:
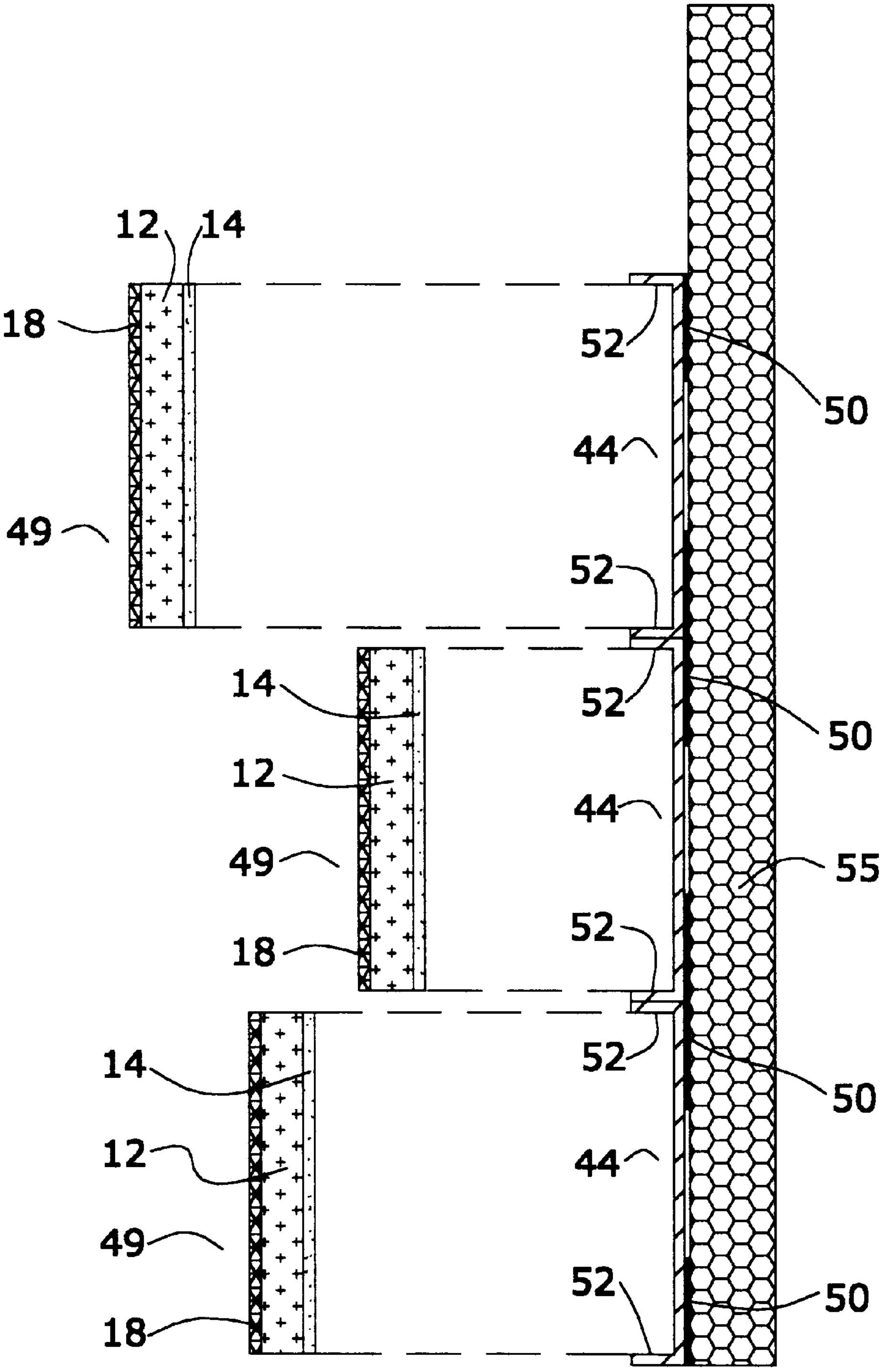
FIG. 8 is an exploded view of the sign system of FIG. 7.

FIG. 8 is another exploded view of the sign system of FIG. 7 in which a multiplicity of magnetic extrusions 44 are adhesively joined to base 55 by adhesive 50. In the preferred embodiment illustrated in this Figure, each of the magnetic extrusions is comprised of outwardly extending alignment arms 52 which allow one to readily align the sign assembly 49 (see FIG. 7) within channel 51 (see FIG. 7). If the alignment arms 52 of adjacent magnetic extrusions 44 are properly disposed vis-a-vis each other, then the sign assemblies 49 disposed in channels 51 also will of necessity be properly disposed vis-a-vis each other.

A Sign Assembly Comprising a Heat Activated Laminating Material

Figure 9:
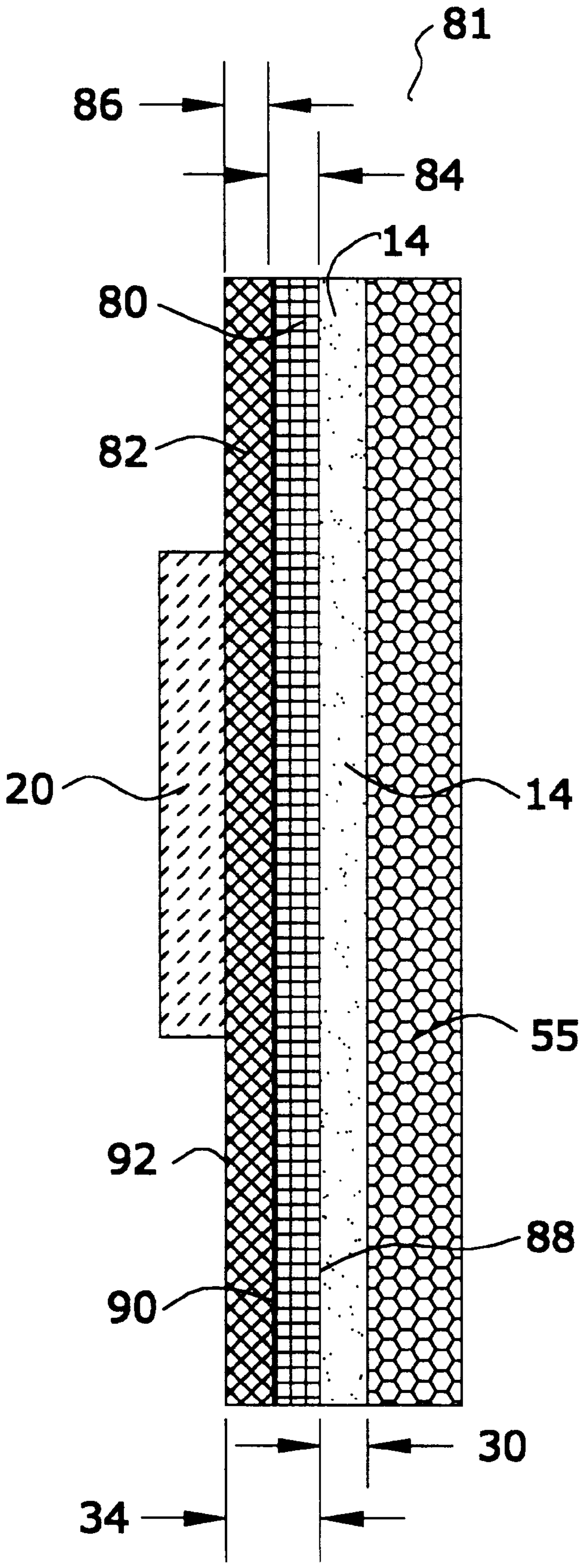
FIG. 9 is a sectional view of yet another sign system of the invention.

FIG. 9 is a sectional view of yet another preferred embodiment of the invention in which the sign assembly 81 is comprised of a heat activated laminating material 82 contiguous with a digital print 80.

Referring to FIG. 9, a layer of magnetic ink 14 with a thickness 30 may be printed onto base 55 with, e.g., a 175 mesh screen by the means described elsewhere in this specification.

A digital print 80, which may contain color graphics, is prepared by conventional means such as, e.g., the means disclosed in one or more of U.S. Pat. Nos. 5,895,836, 5,892,837, 5,871,292, 5,574,659, 4,643,563, 4,584,601, and the like. The disclosure of each of these United States patents is hereby incorporated by reference into this specification.

It is preferred that digital print 80 have a thickness 84 of from about 0.002 to about 0.003 inches. In one embodiment, thickness 84 is about 0.025 inches.

The digital print 80 is adhered to the top surface 88 of magnetic ink layer 14 by conventional means. In one embodiment, the digital print 80 is adhered to top surface 88 by means of pressure sensitive adhesive using an output laminator, such as the Orca-III laminator which is manufactured by the GBC Protech Company of 4151 Anderson Road, Deforest, Wis. 53532.

A film of pressure sensitive laminating material 82 is laminated onto digital print 80 by conventional means. These pressure sensitive laminating materials, and means for laminating digital prints with them, are well known to those skilled in the art and are described in, e.g., U.S. Pat. Nos. 5,639,339, 5,589,021 (transparent protective pressure sensitive laminating film), 5,399,217, 4,909,890, and the like. The disclosure of each of these United States patents is hereby incorporated by reference into this specification.

By way of illustration, one may use one or more of the pressure sensitive laminating films sold by Drytac Canada Inc. of 137 Buttermill Avenue, Concord, Ontario, Canada L4K 3X5. Thus, one may use the "MHL Scribe" film, which is a 3 mil gloss thermoplastic laminate which can be written on with dry erase markers and wiped clean with a dry cloth or eraser. Thus, e.g., one may use the "MHL Matt" film and/or the "MHL Lustre" film, which arc especially adapted for single sided and double sided lamination (encapsulation) of photographic, electrostatic, inket, and laser output. The "MHL Matt" film is a 3 mil laminating film with a matt finish that eliminates reflection and glare. These laminating films encapsulate and protect the digitial print 80. The surface finish 92 of these laminating preferably is transparent to as to expose digitial print 80.

Referring again to FIG. 9, the flexible magnetic sheet 20 is magnetically attached to magnetic ink layer 14 through digital print 80 and heat activated laminating film 82.

In one preferred embodiment, illustrated in FIG. 9, the pressure sensitive laminating material 82 has a thickness 86 of from about 0.0017 to about 0.0030 inches, and the thickness 34 of the laminated digital print preferably does not exceed about 0.0055 inches.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A magnetic modifiable sign system comprised of a plastic substrate with a top surface and a bottom surface, a layer of magnetic ink, a layer of ultraviolet curable white ink, a layer of ultraviolet curable colored ink, a first sheet comprised of flexible magnetic material which is removably and magnetically attached to said layer of magnetic ink through said layer of ultraviolet curable white ink, and a second sheet comprised of flexible magnetic material which is removably and magnetically attached to said layer of magnetic ink through said layer of ultraviolet curable white ink, wherein:

(a) said plastic substrate has a top surface, a bottom surface, and a thickness of from about 0.01 to about 0.125 inches, (b) said layer of magnetic ink has a top surface and a bottom surface, said bottom surface of said layer of magnetic ink is contiguous with said top surface of said plastic layer, and said layer of magnetic ink has a thickness of less than about 0.005 inches, (c) said layer of ultraviolet curable white ink has a top surface and a bottom surface, said bottom surface of said layer of ultraviolet curable white ink is contiguous with said top surface of said layer of magnetic ink, and said layer of ultraviolet curable white ink has a thickness of less than about 0.004 inches, (d) said layer of ultraviolet curable colored ink has a top surface and a bottom surface, said bottom surface of said layer of ultraviolet curable colored ink is contiguous with said top surface of said layer of ultraviolet curable white ink, and said layer of ultraviolet curable colored ink has a thickness of less than about 0.004", and (e) the distance between said top surface of said layer of magnetic ink and said top surface of said layer of ultraviolet curable colored ink is less than about 0.006 inches.

2. The sign system as recited in claim 1, wherein said plastic is selected from the group consisting of acrylonitrile-butadiene-styrene, polystyrene, and polyvinyl chloride.

3. The sign system as recited in claim 2, wherein said plastic is polystyrene.

4. The sign system as recited in claim 3, wherein said polystyrene has a thickness of from about 0.015 to about 0.060 inches.

5. The sign system as recited in claim 4, wherein said polystyrene is high impact polystyrene with a specific gravity of from about 1.054 to about 1.070, a tensile strength of from about 4,000 to about 10,000 pounds per square inch, and a compressive strength of from about 12,000 to about 17,000 pounds per square inch.

6. The sign system as recited in claim 4, wherein said layer of magnetic ink has a thickness of less than about 0.003 inches.

7. The sign system as recited in claim 6, wherein said layer of ultraviolet curable white ink has a thickness of less than about 0.003 inches.

8. The sign system as recited in claim 7, wherein said white ink is high gloss white ink.

9. The sign system as recited in claim 7, wherein said layer of ultraviolet curable colored ink is produced by overprinting a series of four plates in yellow, magenta, cyan, and black ink.

10. The sign system as recited in claim 7, wherein said layer of ultraviolet curable colored ink is comprised of one color.

11. The sign system as recited in claim 7, wherein said layer of ultraviolet curable ink is comprised of two colors.

12. The sign system as recited in claim 7, wherein said layer of ultraviolet curable ink has a thickness of less than about 0.003 inches.

13. The sign system as recited in claim 1, wherein each of said first sheet of flexible magnetic material and said second sheet of flexible magnetic material is a die cut sheet.

14. The sign system as recited in claim 13, wherein each of said first sheet of flexible magnetic material and said second sheet of flexible magnetic material has a thickness of from about 0.025 to about 0.06 inches.

* * * * *